No. 712,674. Patented Nov. 4, 1902.
P. HARRIS.
VALVE GEAR FOR STEAM ENGINES.
(Application filed Jan. 11, 1901.)
(No Model.)

WITNESSES:
D. E. Carlsen
E. C. Carlsen

INVENTOR.
Philip Harris.
BY his ATTORNEY.
A. M. Carlsen.

UNITED STATES PATENT OFFICE.

PHILIP HARRIS, OF GARDEN CITY, MINNESOTA.

VALVE-GEAR FOR STEAM-ENGINES.

SPECIFICATION forming part of Letters Patent No. 712,674, dated November 4, 1902.

Application filed January 11, 1901. Serial No. 42,912. (No model.)

*To all whom it may concern:*

Be it known that I, PHILIP HARRIS, a citizen of the United States, residing at Garden City, in the county of Blue Earth and State of Minnesota, have invented certain new and useful Improvements in Valve-Gear for Steam-Engines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in valve-gears for steam-engines; and the objects of my invention are, first, to provide a novel reversing-gear for steam-engines; second, to provide a valve-gear by which the valve may be so controlled by a single lever as to reverse or run the engine in either direction and also to vary the cut-off and lead, and thereby the expansion and amount of steam to be used, according as circumstances may require. These objects I attain by the novel construction and arrangement of parts illustrated in the accompanying drawings, in which—

Figure 1:
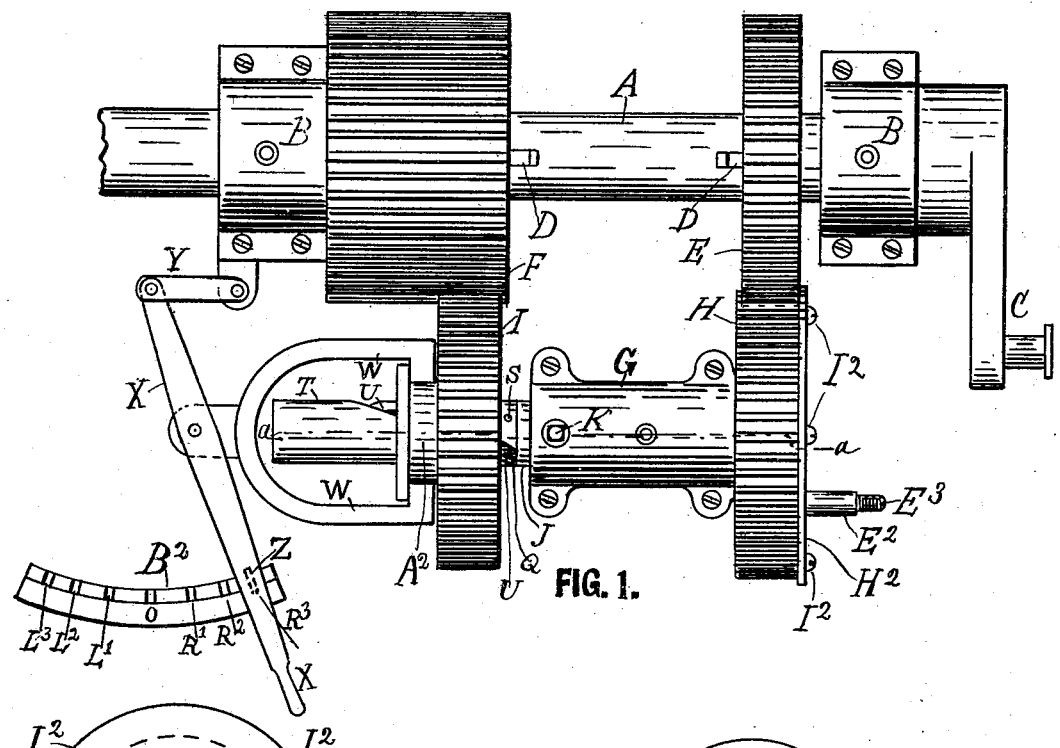
Figure 2:
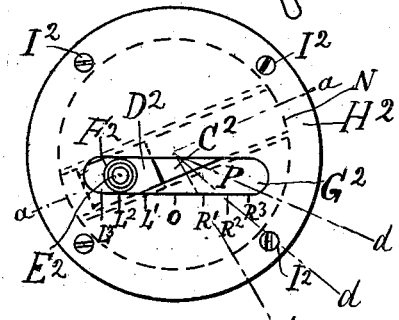
Figure 3:
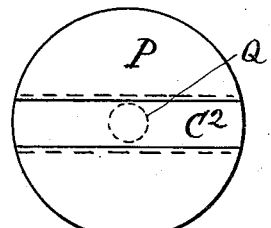
Figure 4:
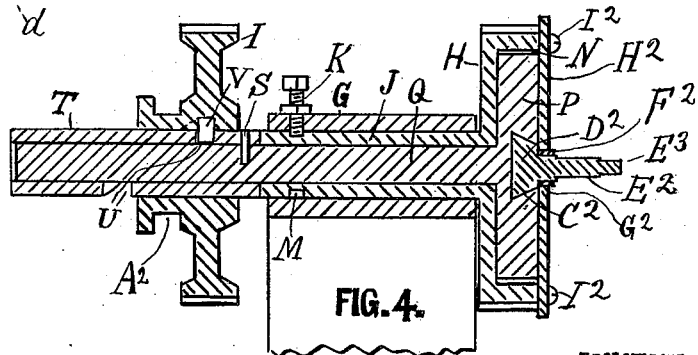

Figure 1 is a top view of a portion of a steam-engine with my new valve-gear applied. Fig. 2 is a face view of the disk $H^2$ in Fig. 1. Fig. 3 is a detail view of the crank-disk P in Fig. 2. Fig. 4 is a sectional view on the line $a$ $a$ in Figs. 1 and 2.

Referring to the drawings by letters of reference, A represents the shaft of a common engine. It rests in the bearings B and has a single crank C, adapted to be operated by the regular connecting-rod of the engine. Upon this shaft A are secured by the keys D the two cog-wheels E and F, which are of equal diameter; but the wheel F has a much broader face than the other wheel. Mounted on the stand or bearing G and meshing with said wheels E and F are two other cog-wheels H and I, which are of the same diameter as the wheels E and F. The wheel H is secured in the sleeve J, which is journaled in the bearing G, in which it is retained by the point of the screw K engaging the annular groove M of the sleeve.

In the cavity N of the wheel H is housed a disk P, secured on a shaft Q, on which is secured by the pin S the sleeve or enlargement T, provided with a spiral groove U, in which guides an oblique feather-key V, secured in the wheel I, which slides on the sleeve T and partly turns it when moved by the fork W, engaging the groove $A^2$ and the lever X, pivoted to the fork and to suitable framework by the link Y or in any other suitable manner, and is provided with a tooth Z, adapted to be placed into any of the notches R or L in the segment $B^2$, which is suitably connected with parts of the framework. (Not shown.) The disk P is provided with a diametrical dovetailed groove $C^2$, in which slides the head $D^2$ of the pin $E^2$, upon which is to be secured the end of the valve-operating rod, (not shown,) preferably by a nut screwed onto the threaded end $E^3$ of the pin. Upon said pin $E^2$ is a short sleeve $F^2$, adapted to revolve on the pin, and thus reduce the friction against the edges of the slot $G^2$ of the plate $H^2$, secured by the screws $I^2$ upon the wheel H in such a position that the slot stands at a right angle with the direction of the crank of the engine whenever the crank is on either half or full stroke.

From the above description it will be understood by those skilled in the building and use of steam-engines that the wheels I and H, meshing with the wheels on the engine-shaft, cannot change their relative positions by turning; but when the lever X is set at $R^3$ the key in the wheel I turns the shaft and disk P so that the valve-operating pin $E^2$ comes to the point $R^3$ in the end of the slot $G^2$ in Fig. 2 where the pin gives the greatest motion to the valve, and thus causes the engine to run at full speed "to the right," as we may say. If the lever X is placed in the notch $R^2$, the valve-operating crank formed by the pin E and disk P is thereby shortened to mark $R^2$ in Fig. 2, and the engine will run slower, or, at least, with less power, as the steam-ports are less exposed to the live steam by the lessened motion of the valve. If the lever is placed at R' on the segment, the pin will move to R' in Fig. 2 and the engine will barely turn. If the lever and pin are brought to the marks O in Figs. 1 and 2, respectively, the engine will stop, and if brought to L' the engine will reverse slowly "to the left," we may say, and its speed in that direction will increase according as the lever X and pin $E^2$ are moved along to $L^2$, $L^3$, or any other points upon the left half of the segment $B^2$. It will also be understood that as the pin $E^2$ is moved toward the middle of the slot $G^2$ it does not only reduce the stroke of the slide-valve or other valve used to admit the steam to the cylinder, but it also changes the relative direction or position of the valve-crank to the engine-crank, thereby changing the "lap" and lead—terms well understood about steam-engines. This can be seen and understood by looking at the radial lines $d\ d\ d$ in Fig. 2, which represent three different positions of the pin $E^3$ caused by the motion of the lever X without changing the position of the crank C of the engine.

Having thus described my invention, what I claim, and desire to secure by Letters Patent, is—

In a steam-engine and mounted in a suitable framework, the combination with the crank-shaft of the engine of the gear-wheel E secured on the engine-shaft and the wheel H being of the same size as the wheel E and meshing with the latter, the disk P rotating in a concentric cavity of the wheel H and having a diametrical groove and having the pin $E^2$ by which to operate the valve which admits steam to and from the cylinder of the engine; the plate or disk $H^2$ covering the cavity of the wheel H, and having the slot $G^2$ for the pin E to move in and a suitable mechanism for moving and retaining the pin at any desired point of the slot $G^2$ while the engine is in motion as well as while it stands still, said mechanism consisting of the shaft Q secured to the disk P and having the spiral groove U; the sliding gear-wheel I having a key engaging the groove U, the broad-faced gear-wheel F secured on the engine-shaft and meshing with the gear I; said gear I having the annular groove $A^2$, a fork engaging said groove and having a lever mechanism by which it may be moved and held in various positions, substantially as and for the purpose set forth.

In testimony whereof I affix my signature in presence of two witnesses.

PHILIP HARRIS.

Witnesses:
DAN. HARRIS,
R. H. HUGHES.